(12) United States Patent
Wagner

(10) Patent No.: US 8,791,164 B2
(45) Date of Patent: Jul. 29, 2014

(54) DEVICE AND METHOD FOR INCREASING THE EFFECTIVENESS PROCESSES OF CATALYTIC CHEMICAL PROCESSES

(76) Inventor: Edmund Wagner, Wiesbaden (DE)

( * ) Notice: Subject to any disclaimer, the term of this patent is extended or adjusted under 35 U.S.C. 154(b) by 262 days.

(21) Appl. No.: 13/183,998

(22) Filed: Jul. 15, 2011

(65) Prior Publication Data

US 2012/0016040 A1 Jan. 19, 2012

(30) Foreign Application Priority Data

Jul. 16, 2010 (EP) ..................................... 10169895

(51) Int. Cl.
*C07C 27/00* (2006.01)

(52) U.S. Cl.
USPC .......................................................... 518/700

(58) Field of Classification Search
USPC .......................................................... 518/700
See application file for complete search history.

(56) References Cited

U.S. PATENT DOCUMENTS

2003/0086834 A1   5/2003   Rivin
2008/0257713 A1   10/2008  Grant

FOREIGN PATENT DOCUMENTS

GB   669311   *   7/1947

OTHER PUBLICATIONS

European Search Report issued on Dec. 21, 2010 in European Application No. 10169895.9 filed Jul. 16, 2010.

\* cited by examiner

*Primary Examiner* — Jafar Parsa
(74) *Attorney, Agent, or Firm* — Drinker Biddle & Reath LLP

(57) ABSTRACT

The present invention relates to a monolithic solid catalyst for carrying out a heterogeneous catalytic chemical reaction in a reaction fluid which flows through the catalyst and comprises at least one educt, wherein the catalyst has at least one passage opening for the reaction fluid to flow through the catalyst.

Figure 1:
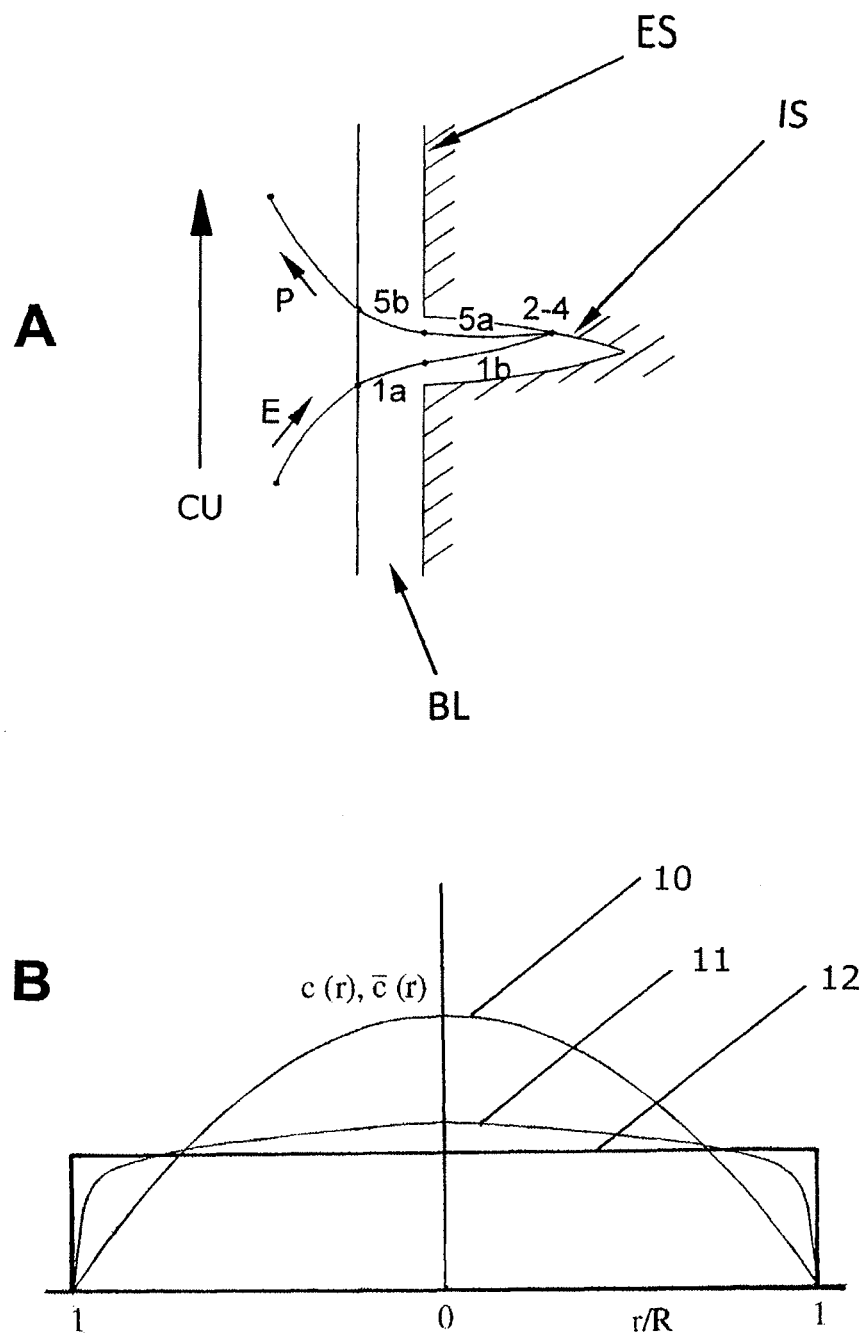

In order to obtain a larger and targeted yield and selectivity of the sought reaction products with a smaller design of the reactors, smaller energy feed and smaller reaction pressures and/or lower reaction temperatures, it is proposed according to the invention that, to increase the effectiveness of the chemical reaction, the catalyst has at least one mechanical oscillator by which, while carrying out the chemical reaction, the catalyst can be subjected to a mechanical frequency in the range of from 20 kHz to 2 GHz.

2 Claims, 6 Drawing Sheets

$$\text{rect}'(t) = \delta\left(t + \tfrac{1}{2}\right) - \delta\left(t - \tfrac{1}{2}\right)$$

$$x(t) = K\delta(t) \circ\!\!-\!\!\bullet\, X(f) = K$$

$$\text{Ш}(t) = \sum_{n=-\infty}^{\infty} \delta(t-n) \circ\!\!-\!\!\bullet \int_{-\infty}^{\infty} \sum_{n=-\infty}^{\infty} \delta(t-n) \cdot e^{-j2\pi ft} dt$$

DEVICE AND METHOD FOR INCREASING THE EFFECTIVENESS PROCESSES OF CATALYTIC CHEMICAL PROCESSES

RELATED APPLICATION DATA

This application claims priority under 35 U.S.C. §119 and/or §365 to European Application No. 10 169 895.9 filed Jul. 16, 2010, the entire contents of which is incorporated herein by reference.

This invention relates to a device and a method for increasing the effectiveness of catalytic chemical processes. In particular the invention relates to a monolithic solid catalyst which has at least one passage opening for a reaction fluid to flow through the catalyst.

Catalysis is extensively used in chemical process engineering to accelerate reactions or shift reaction equilibria in a specific direction. One catalyst type is the solid catalyst which heterogeneously catalyses the reaction of gases or liquids. Examples of such catalyses are the Fischer-Tropsch synthesis (FTS), the Sabatier process, the Haber-Bosch method or a large number of other reactions which proceed with solid catalysts. The catalyst can for example be used in a fixed-bed reactor in the form of a bed or packing of solids particles. The particles of the bed or packing can consist of the catalyst material or be coated with it. An alternative to this are monolith reactors in which the catalyst is constructed in one piece or from components firmly connected to one another which jointly form a coherent catalyst body.

In monolith reactors the educts of a specific reaction approximate the catalyst material in order to be converted in a catalysed process. Physisorption and chemisorption occur at the surface of the catalyst in connection with the catalytic reaction (cf. Ertl, *Reaktionen an Oberflächen: Vom Atomaren zum Komplexen*, Angewandte Chemie 2008-120/19, p. 3582 ff.). However, the boundary layer of a current which passes through the catalyst has only a very low flow rate and no current components in the direction of the catalyst surface and can therefore form a barrier for educts and products between the main stream through the catalyst and the catalyst material which can normally be penetrated only by diffusion.

In order to improve the thorough mixing of the reaction gas, catalysts are often designed such that the current in the passage openings through a catalyst is turbulent (Reynolds number Re>3,000). However, this in turn has the disadvantage that when—as is frequently desired—the diameter of the passage openings for the medium is small, relatively high current speeds are necessary in order to achieve turbulence. As a certain reaction time is necessary, correspondingly long passage openings are then also necessary as reaction channels, which in turn requires the dimensions of the catalyst to be large.

Compared with this state of the art, the object of the invention is to obtain a better yield of the sought reaction products with a smaller design of the reactors and smaller energy feed, in other words smaller reaction pressures and/or lower reaction temperatures. The aim of the invention is inter alia to be able to dispense with turbulent current but nevertheless achieve the desired high reaction yields.

This object is achieved according to the invention by a monolithic solid catalyst for carrying out a heterogeneous catalytic chemical reaction in a reaction fluid which flows through the catalyst and comprises at least one educt, wherein the catalyst has at least one passage opening for the reaction fluid to flow through the catalyst, characterized in that, to increase the effectiveness of the chemical reaction, the catalyst has at least one mechanical oscillator, by which, when carrying out the chemical reaction, the catalyst can be subjected to a mechanical frequency in the range of from 20 kHz to 1 GHz.

The overcoming of a current boundary layer occurring in the catalyst by mechanical excitation of the educt molecules in conjunction with the mechanical movement of the catalyst surface is accelerated by the catalyst according to the invention. Resonance frequencies of many molecules are affected by frequencies of from 20 kHz to 1 GHz, with the result that these achieve particularly large oscillation amplitudes. The frequency can therefore be set to different educts. In specific embodiments of the invention frequencies in the range of from 20 to 500 kHz are therefore of advantage. In other embodiments frequencies in the range of from 100 to 800 kHz are advantageous. In further embodiments frequencies in the range of from 500 kHz to 1 GHz are advantageous. In particular embodiments, in particular with very light molecules, the frequency can also exceed 1 GHz and for example lie in the range of from 1 to 2 GHz.

In order to suitably excite different molecules, frequency mixtures with different frequencies can also be used.

As a result of the frequency input in the defined range, turbulent current can inter alia be dispensed with and yet the desired high reaction yields be achieved with the device according to the invention. The advantage lies inter alia in the fact that laminar current conditions in the catalyst are clearly better and more easily handled than turbulent current conditions.

The oscillations are preferably excited in longitudinal direction. The whole body of the catalyst that acts as reactor is preferably made to oscillate. Alternatively or additionally, transverse oscillations can also be excited which can bring about an excitation of the penetrating reaction fluid at specific points of the periphery of passage openings through the catalyst as surface waves.

In a further embodiment of the invention the catalyst has, in addition to a first mechanical oscillator, a second mechanical oscillator, the direction of oscillation of which is at an angle of at least 20° to the direction of oscillation of the first oscillator. When carrying out the chemical reaction, the catalyst can also be subjected by this second mechanical oscillator to a mechanical frequency in the range of from 20 kHz to 1 GHz. In specific embodiments of the invention the frequencies lie in the range of from 20 to 500 kHz. In other embodiments frequencies in the range of from 100 to 800 kHz are advantageous. In further embodiments frequencies in the range of from 500 kHz to 1 GHz are advantageous. In particular embodiments, in particular with very light molecules, the frequency can also exceed 1 GHz and for example lie in the range of from 1 to 2 GHz.

By providing a second direction of the oscillation excitation, a passage opening can be made to oscillate in two directions. Also, special oscillation patterns of individual molecules, the paths of which can for example run on Lissajous' figures given corresponding frequencies and phase relationships, can be excited by the two-dimensional excitation. Specific oscillation pictures can be fixed by suitable setting of the excitation frequencies of both oscillators, with the result that in particular in conjunction with a laminar current in the passage opening and correspondingly stable current profile repeatable reaction courses result which are precisely reproducible. There are then stationary current conditions in every part of the catalyst and a reproducible improvement of the reaction velocity through the mechanical oscillations. The direction of oscillation of the second oscillator is preferably perpendicular (at 90°) to that of the first oscillator.

In a further embodiment of the invention the catalyst additionally has a third mechanical oscillator, the direction of oscillation of which is at an angle of at least 20° to the plane encompassing the directions of oscillation of the first and second oscillators. When carrying out the chemical reaction, the catalyst can also be subjected by this third mechanical oscillator to a mechanical frequency in the range of from 20 kHz to 1 GHz and/or in the range of from 1 GHz to 2 GHz. In specific embodiments of the invention the frequencies lie in the range of from 20 to 500 kHz. In other embodiments frequencies in the range of from 100 to 800 kHz are advantageous. In further embodiments frequencies in the range of from 500 kHz to 1 GHz are advantageous.

The provision of a third mechanical oscillator widens the possibilities of creating specific oscillation patterns in the reaction fluid. In particular it is thereby made possible to make the surface of passage openings which pass three-dimensionally through the catalyst oscillate at every point, wherein the direction of oscillation has at least one component which is perpendicular to the surface. This applies for example to passage openings which pass through the catalyst in the form of a helix. The direction of oscillation of the third oscillator preferably lies perpendicular to the plane covered from the directions of oscillation of the first and second oscillators.

In a further embodiment the oscillator(s) is (are) chosen and set such that a standing wave transverse to the longitudinal axis of the passage opening forms in the reaction fluid in the at least one passage opening.

For this the excitation frequency must be chosen such that a wavelength which corresponds to the diameter of the channel forms in the fluid. The excitation frequency also depends on the sound velocity in the fluid. Opposing wall sections move parallel to one another. Alternatively multiples of the named frequency can also be used, wherein additional wave crests corresponding to the multiplier form between the walls of the passage opening. When using more than one excitation direction, in particular perpendicular to the throughflow direction of the passage opening, several standing waves can be superimposed in different directions. An antinode can lie against every point of the surface, wherein the antinodes can achieve their maximum amplitude time-shifted relative to one another.

The oscillation frequency of the at least one oscillator is preferably chosen such that the molecular mass of at least one educt of the chemical reaction is excited to oscillate. If the reaction has two educts, the oscillation frequency of at least one oscillator is preferably chosen such that the molecular mass of at least the first educt of the chemical reaction is excited to oscillate, and the oscillation frequency of at least a second oscillator is chosen such that the molecular mass of at least the second educt of the chemical reaction is excited to oscillate.

The frequency is advantageously selected such that an oscillation of the educt takes place in the resonance of its molecules. The amplitudes are then particularly large. Several different frequencies can also be superimposed in order to excite different educts on their resonance frequency, for example $CO_2$ molecules and $H_2$ molecules.

Laminar or also turbulent current can occur in the passage opening of the catalyst—depending on the geometry of the passage opening and flow rate of the fluid. An advantage of a laminar, as against a turbulent, current is that the laminar current is not associated with a minimum speed. It can thereby be achieved that a complete reaction takes place even in shorter passage openings. However, a disadvantage compared with turbulent currents is that a much thicker boundary layer forms, which frequently coalesces into the middle of the passage opening. The typical laminar tube current with parabolic speed distribution then forms. This laminar current has no speed components transverse to the longitudinal axis of the passage opening, with the result that a thorough mixing of the fluid transverse to the direction of flow takes place only through diffusion.

In an alternative embodiment of the invention the average speed of the current of the reaction fluid through a passage opening is therefore chosen such that a turbulent current forms. In a further alternative of the invention however the average speed of the current of the reaction fluid through a passage opening is chosen such that a laminar current forms, as the above-described disadvantage of the laminar current can be overcome by subjecting the reaction fluid to mechanical oscillations, whereby the molecules in the boundary layer are also excited to oscillate. In this way the diffusion transverse to the direction of flow rises and thus the likelihood of an educt molecule coming into contact with the catalyst, which in turn improves the catalysis.

In a further embodiment of the invention the oscillator or the oscillators are controlled by a signal with pulse amplitude modulation.

In pulse amplitude modulation, instead of a continuous signal, individual pulses of different amplitudes are used to control a mechanical oscillator. The pulses essentially imitate a sine signal or superimposed sine signals. The frequency of the pulses is advantageously higher than the frequency of the highest represented sine function, preferably at least twice as high, preferably at least five times as high or particularly preferably at least ten times as high. The signal for controlling the mechanical oscillator can be produced by modulating a pulse train with a modulation signal in the amplitude. The modulation signal is preferably a sine oscillation or several superimposed sine oscillations. The modulation can be carried out by a person skilled in the art according to the state of the art.

In a further embodiment the oscillator(s) is (are) controlled by a signal with pulse frequency modulation or with pulse phase modulation corresponding to a Dirac comb signal.

The signal can be a sine signal, but also a different periodic signal type, such as a square-wave or triangular signal. With a signal with pulse frequency modulation, for example a signal with sine form or with several superimposed sine functions can be approximated. A signal with pulse frequency modulation can be created by creating a pulse train such that the temporal density of the pulses increases or decreases with the amplitude of a modulation signal. Corresponding methods are well known to a person skilled in the art from the state of the art, in particular in communications engineering.

In the case of a signal with pulse phase modulation the position of a pulse within a fixed time interval is controlled by a modulation signal. Such a signal can be created by delaying individual pulses from a signal with uniform distances between pulses to different extents depending on the modulation signal. Corresponding methods are known to a person skilled in the art from the state of the art in the field of communications engineering.

A Dirac comb signal consists, in an idealized case, of sharp pulses of infinite height and infinitesimally short time length with fixed gaps. Infinitely high and infinitesimally short pulses cannot be realized in practice and are therefore approximated by pulses that are as short and high as possible. In an ideal case such pulses excite the whole frequency spectrum. In practice, however, there is a limit frequency beyond which excitation no longer occurs. This excitation is carried out repeatedly through the repeated impacting with individual approximated Dirac pulses by a Dirac comb signal. The mentioned limit frequency is advantageously chosen such that it lies higher than the resonance frequency of educts whose reaction is to be accelerated by the oscillations.

In a further embodiment at least two oscillators are controlled by different signals.

In this way for example two different educt or also intermediate product molecules can be made to resonate, in order to thus accelerate a reaction at the catalyst. The two signals can also be chosen such that specific oscillation patterns of molecules, e.g. in the form of Lissajous' figures, form.

A further aspect of the invention relates to a unit for carrying out heterogeneous catalytic chemical reactions in a reaction fluid, wherein the unit comprises a catalyst according to the invention.

In an embodiment of the unit the Fischer-Tropsch synthesis takes place in the unit. In a further embodiment the Sabatier synthesis takes place in the unit.

In yet another embodiment of the unit there is additionally a device for obtaining the educt $CO_2$ from air and/or additionally a device for obtaining the educt $H_2$ by means of electrolysis from water.

In conjunction with the Fischer-Tropsch synthesis or the Sabatier synthesis hydrocarbons can be produced from air and water in this way. Advantageously the necessary electric energy is obtained from renewable energy sources for even more self-sufficient operation.

In a further aspect the invention relates to a method for carrying out a heterogeneous catalytic chemical reaction in a reaction fluid which flows through a catalyst and which comprises at least one educt, wherein the catalyst is subjected to a mechanical oscillation in the range of from 20 kHz to 1 GHz.

The advantages and details of the mechanical oscillation during the catalysis have already been outlined in detail above in relation to a corresponding catalyst and also apply to the method according to the invention.

In a further embodiment of the method the oscillation frequency is chosen such that the molecular mass of at least one educt is excited to oscillate. The excitation of resonance frequencies of educt and intermediate product molecules is particularly preferred.

Figure 2:
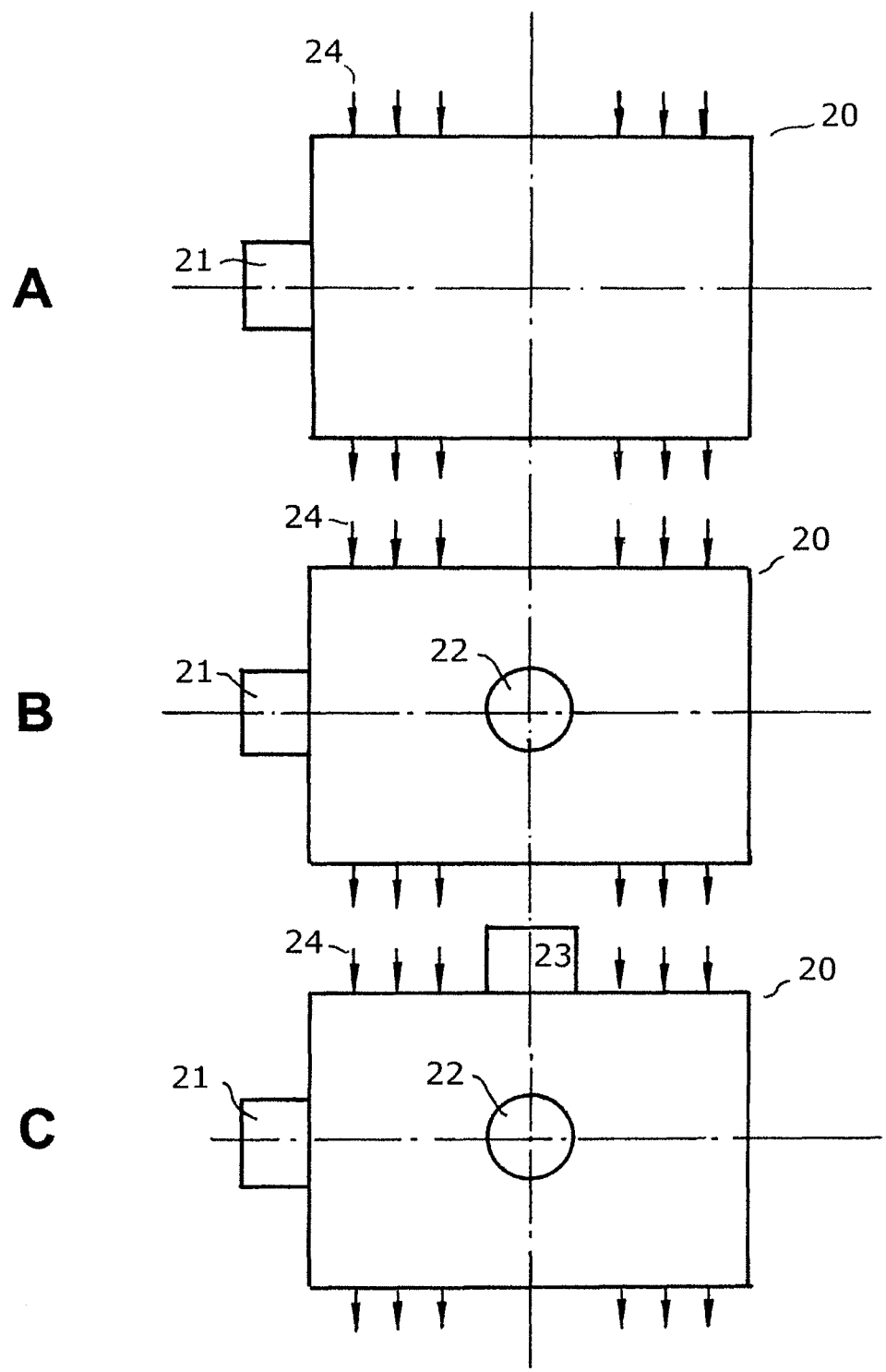
Figure 3:
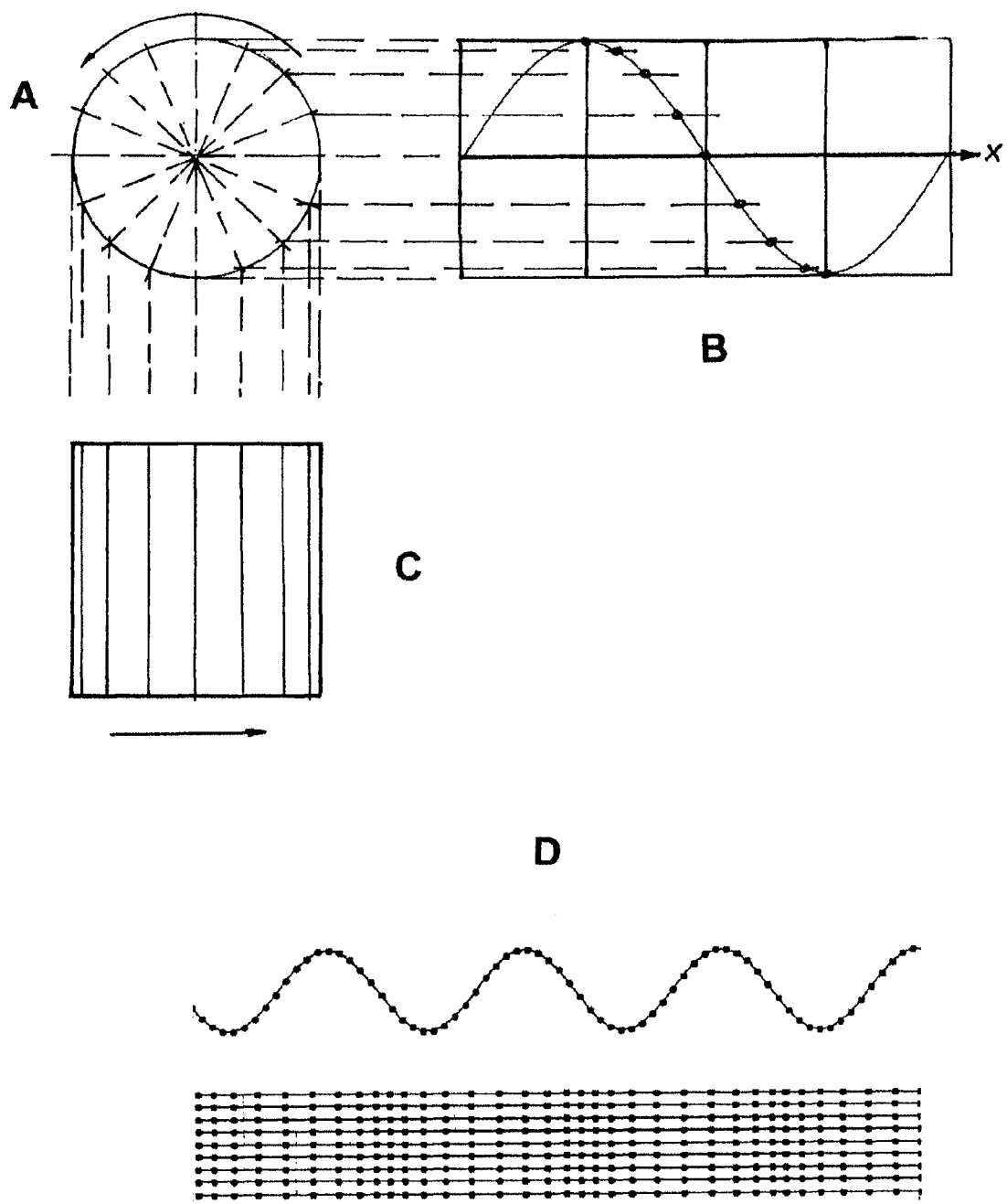
Figure 4:
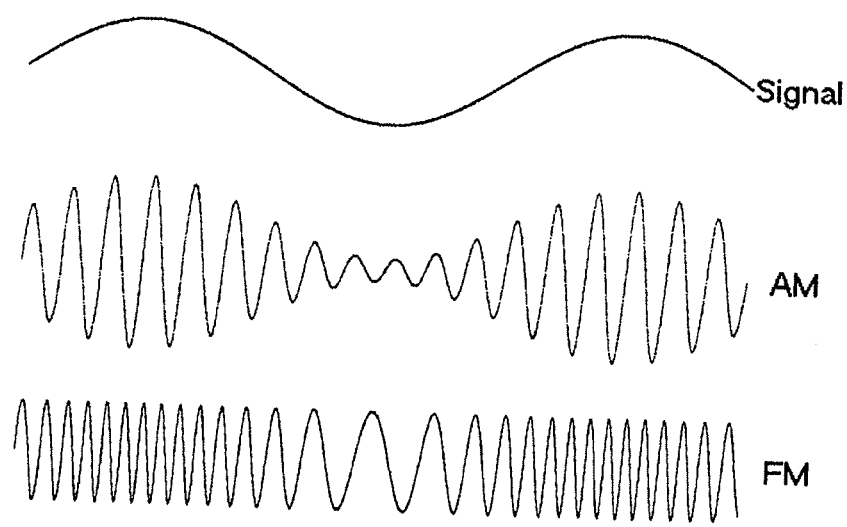
Figure 5:
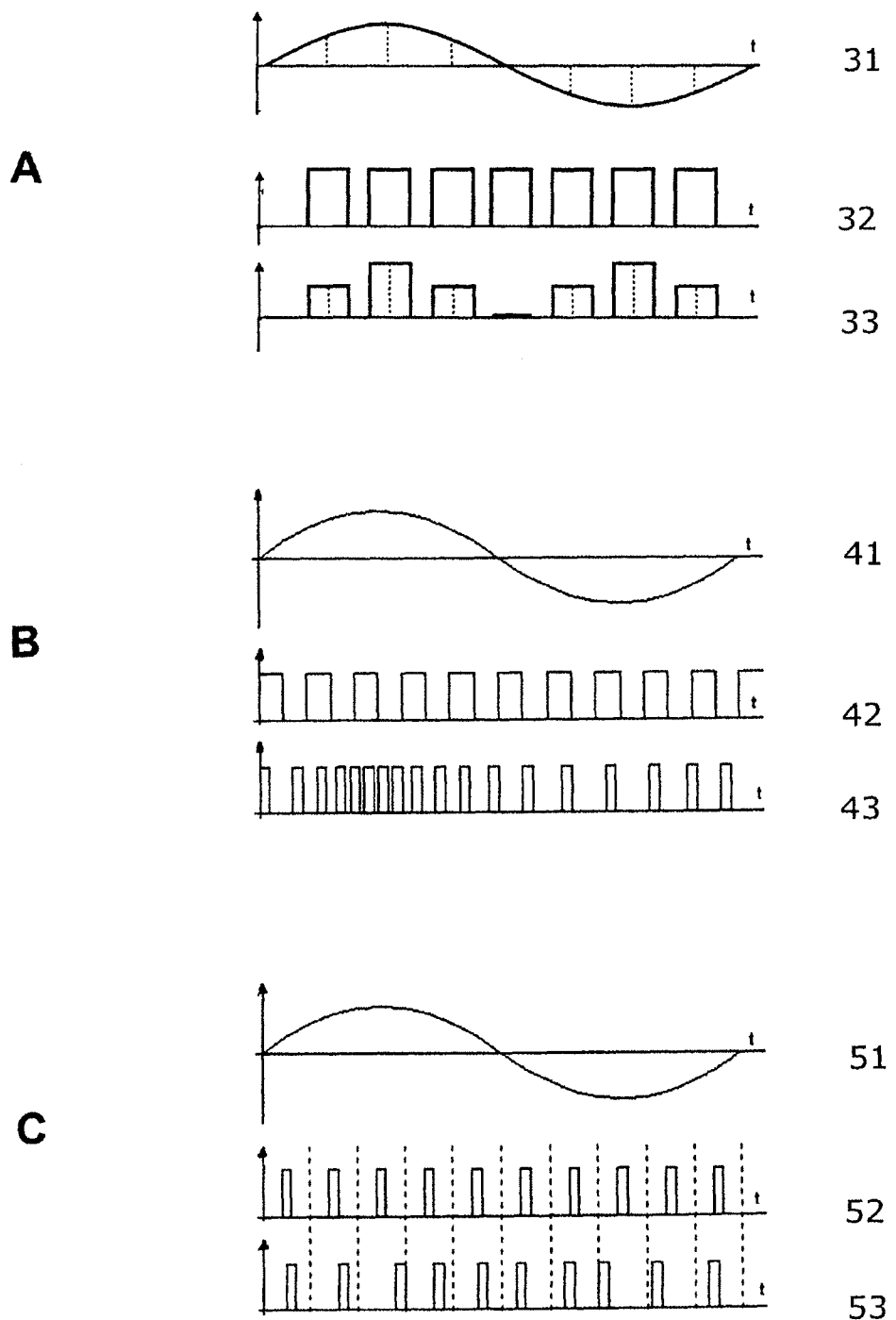

Further advantages, features and application possibilities of the invention result both from the following description of preferred embodiments and from the associated figures. There are shown in:

FIG. 1A: schematically a reaction course in a pore of a catalyst,

FIG. 1B: a velocity diagram of the current profile in a passage channel through a catalyst with different current profiles, FIG. 2A: a catalyst according to the invention with a mechanical oscillator, FIG. 2B: a catalyst according to the invention with two mechanical oscillators, FIG. 2C: a catalyst according to the invention with three mechanical oscillators, FIG. 3A-C: a schematic representation of the creation of a longitudinal sine wave, FIG. 3D: the course of a sine wave and the corresponding course of a longitudinal wave, FIG. 4: amplitude and frequency modulation of sine waves, FIG. 5A: the amplitude modulation of pulses with a sine wave (pulse amplitude modulation), FIG. 5B: frequency modulation of pulses with a sine signal (pulse frequency modulation), FIG. 5C: modulation of the phase of a pulse signal with a sine wave (pulse phase modulation), FIG. 6A: schematic representation of a pulse course over time, FIG. 6B: schematic representation of the course of an approximated Dirac collision over time and FIG. 6C: a schematic representation of a train of approximated Dirac collisions.

In FIG. 1A the course of a reaction at the surface of a pore of a catalyst is schematically represented. Educts E are transported with the current CU of the reaction medium and reach the vicinity of the boundary layer BL mainly through diffusion. The educts E then diffuse through the boundary layer, which is called film diffusion 1a. By means of pore diffusion 1b, they then penetrate the pore, where they touch the wall of the catalyst in the inside of the pore IS, and then react with one another. This takes place in the form of the processes 2 to 4, which are known to a person skilled in the art as adsorption/physisorption 2, surface reaction/chemisorption 3 and desorption 4, optionally also as Knudsen diffusion. After the reaction the reaction product leaves the pore via pore diffusion 5a and then passes by means of film diffusion 5b through the boundary layer BL. In this way the concentration of the product P in the current CU increases. The same process also takes place at the external surface of the catalyst ES, wherein however the diffusion into and out of the pore 1b and 5a is omitted. The excited oscillations of the particles have the effect of supporting the diffusion processes and the reaction in respect of quantum chemistry. Pores serve inter alia to enlarge the surface of catalysts. However, because of the frequency input according to the present invention the provision of pores in catalysts is not essential, as the effect which can be achieved by pores can here be achieved by the positive effect of the frequency input. Nevertheless it may be of advantage in specific embodiments to provide catalysts with both frequency input and pores.

In FIG. 1B three different current profiles according to the state of the art are represented. In the diagram, the normalized radius of a passage opening is represented on the X-axis. The normalization is relative to the overall radius, wherein the middle of the passage opening is defined as origin 0. The coordinates therefore run from the middle of the passage opening to its edge. At the edge the normalized coordinate is 1. Inside a passage opening with circular cross-section a rotation-symmetrical current profile forms, the cross-section of which is represented in a diagram in FIG. 1B for different cases. 10 denotes an ideal parabolic current profile in the case of laminar current. All particles flow parallel in direction of flow, wherein the speed decreases towards the wall. Thus there is no thorough mixing of the parallel-running stream lines through the current. The speed is approaching 0 at the wall.

The course of a turbulent current is denoted by 11. In the case of such a current there is a laminar boundary layer which extends from the wall of the passage opening over the straight part of the curve 11 from radius 1 roughly to the start of increasing bending of the curve. The current in the inner part of the passage opening is completely turbulent, i.e. there are also speeds transverse to the direction of flow, with the result that the reaction fluid is thoroughly mixed. In the laminar boundary layer at the wall the stream lines are parallel in the wall and there is no thorough mixing of the reaction fluid.

An idealized, uniform current is denoted by 12 and represented as a comparison with the real current profiles. Here the speed of the current is equal over the whole cross-section. Such a current does not occur in practice. If need be, it can be approximated by extremely high fluid velocity with very strong turbulence, wherein the boundary layer becomes very thin.

A catalyst 20 with a mechanical oscillator 21 is represented in FIG. 2A. The latter is arranged in a preferred embodiment on an external surface of the catalyst. Its direction of oscillation lies perpendicular to the catalyst surface, with the result that mechanical longitudinal waves are introduced into the catalyst. Fluid 24 flows through the catalyst.

A further embodiment of the catalyst is shown in FIG. 2B. In this embodiment, in addition to the mechanical oscillator 21, a further mechanical oscillator 22 is arranged on an external surface of the catalyst 20. Its direction of oscillation lies perpendicular to the catalyst surface, with the result that mechanical longitudinal waves are introduced into the catalyst. The direction of movement of the mechanical oscillator 22 is perpendicular to the direction of movement of the mechanical oscillator 21. The further shown features are identical with the catalyst according to FIG. 2A.

A further catalyst according to the invention is shown schematically in FIG. 2C. This is a catalyst according to FIG. 2B which has been expanded by a third mechanical oscillator on a third external surface of the catalyst. Its direction of oscillation lies perpendicular to the catalyst surface, with the result that mechanical longitudinal waves are introduced into the catalyst. All the mechanical oscillators 21, 22 and 23 are in each case arranged at right angles to one another. Their directions of movement cover a Cartesian coordinate system.

Alternatively the mechanical oscillators in the embodiments according to FIGS. 2A, 2B and 2C can also be arranged sunk into or in the inside of the catalyst.

In FIGS. 3A, 3B and 3C it is shown what is to be understood by a mechanical transverse wave. In FIG. 3C a section from a fluid or a solid is shown, in which a mechanical transverse wave is travelling, as indicated by the arrow below the square. Phases of the wave which correspond to a specific phase position of the oscillation are shown as vertical lines. In the example shown the phases of the wave lie spatially closer together at the edge of the square than in the middle of the square. Physically this is taken to mean that the density of the particles of the fluid or solid is not uniform along the wave, but sinusoidally distributed. The density of the particles in the wave can be graphically construed, by transferring the coordinates from FIG. 3A, which shows a unit circle with sixteen phase positions 22.5° apart, to FIG. C, as indicated by the broken lines. To illustrate that this is a sine curve, the design of a sine curve from the phase positions in FIG. 3A is shown in FIG. 3B, as likewise indicated by broken lines.

Shown in the lower part of FIG. 3D is a mechanical longitudinal wave which is travelling from left to right through a fluid or a solid. The wave is represented at a fixed point in time and in reality passes through the solid from one side of the diagram to the other, in other words seen as time passes there is a movement of the sine curve through the diagram. The distances between the individual points in the fluid or the solid symbolize the density and thus also the distance between particles in the solid or the fluid. Represented in the upper part is a sine curve which reproduces the distances between two points in the lower diagram. This illustrates that a longitudinal wave which a mechanical oscillator according to the invention, as represented in one of FIG. 2A, 2B or 2C, sends to the catalyst results in a sinusoidal distribution of distances between the particles of the fluid or solid.

Amplitude and pulse modulation are illustrated in FIG. 4. At the top of FIG. 4 is shown a sinusoidal modulation signal in its temporal course, denoted S. A higher-frequency signal is modulated with the latter.

Represented below the signal S is a signal AM which shows an amplitude-modulated signal, whose frequency is higher than that of the modulation signal S. The amplitude of the modulated signal AM corresponds in each case to the strength of the signal S. However, the basic structure of the higher-frequency signal is preserved.

A frequency-modulated signal is reproduced at the bottom of FIG. 4. This has a variable frequency which relates to the amplitude of the signal S. If the amplitude of the signal S is small, the frequency of the frequency-modulated signal falls, whereas it rises when the amplitude of the signal S increases. Accordingly, there is a change in the period length of the individual oscillations in the frequency-modulated signal. These change sinusoidally.

If such modulated signals are sent to a catalyst according to the invention, the resonance frequencies of different molecules can be affected.

FIG. 5A shows the creation of an amplitude-modulated pulse train. The sinusoidal modulation signal 31 is modulated onto a pulse train 32, with the result that pulses with different amplitudes result, which are represented in the diagram 33. A catalyst according to the invention can be subjected to such an amplitude-modulated pulse signal, whereby frequency and amplitude of the amplitude-modulated pulse signal can easily be set by changes to the modulation signal.

The creation of a frequency-modulated pulse signal 43 is represented in FIG. 5B. The pulses of a pulse signal 42 are delayed according to a modulation signal 41 such that the frequency-modulated pulse signal 43 results. This contains the frequency of the pulse signal which is shifted by the modulation frequency. This can be sent to a mechanical oscillator of a catalyst according to the invention.

The creation of a phase-modulated pulse signal 53 is represented in FIG. 5C. The pulses of a pulse signal 52 are enlarged according to a modulation signal 52 such that the phase-modulated pulse signal 53 results. However, unlike the frequency-modulated pulse signal, the pulses remain within their respectively fixedly predetermined time windows.

FIG. 6A shows the theoretical creation of a square-wave pulse which can be sent to a mechanical oscillator of a catalyst according to the invention. In the diagram, time is plotted on the X-axis and the amplitude of the pulse on the Y-axis. At a point in time a the amplitude jumps from value 0 to value 1, is held there until point in time b, when the amplitude drops back to 0 again. Mathematically, this can be reproduced by the formula represented under the diagram.

FIG. 6B shows schematically in a diagram an approximated Dirac pulse which can be used to control one of the mechanical oscillators of a catalyst according to the invention. Seen mathematically, the Fourier transform of a Dirac pulse $\delta(t)$ is a constant value, which means that in an idealized case the pulse contains a mixture of all frequencies. In practice, however, an approximated Dirac pulse does not have an infinite sharpness, as a result of which frequencies only up to a maximum frequency are contained in the approximated Dirac pulse. Consequently, all possible resonance frequencies of particles in the reaction gas up to the maximum frequency can be excited with such a pulse. Advantageously, the maximum frequency contained in the approximated Dirac pulse lies above 1 GHz, preferably above 10 GHz and even more preferably above 100 GHz.

FIG. 6C shows a train of Dirac pulses plotted over time. An excitation with such approximated Dirac pulses can be sent to one of the mechanical oscillators of a catalyst according to the invention. The catalyst and through-flowing reaction gas are thereby excited with a broad frequency mixture. The decaying amplitudes of the oscillations are increased again by the periodic repetition of the approximated Dirac pulses. The distance between the individual Dirac pulses is advantageously chosen such that the oscillations are not brought to a standstill by the decay, but advantageously the next Dirac pulse is sent to the oscillator when the amplitude of the oscillations of the educts has fallen back to 50%.

Figure 6:
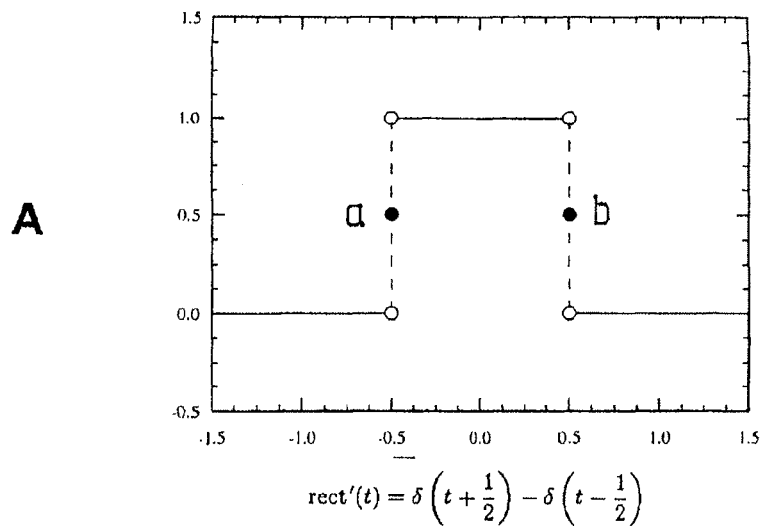
Figure 6:
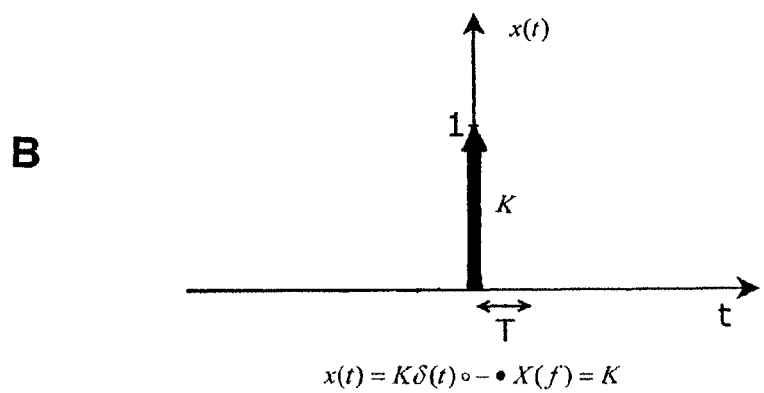
Figure 6:
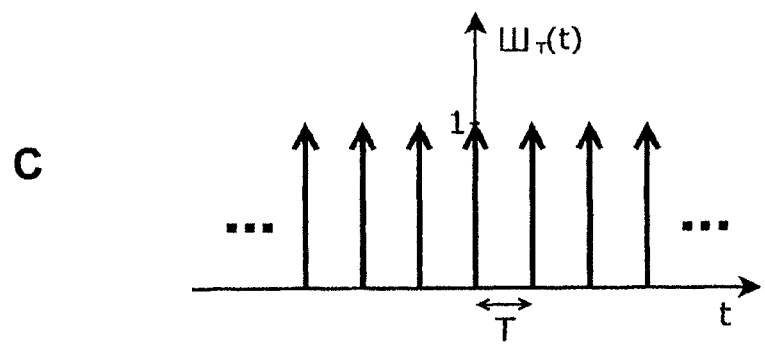

The presented process engineering becomes interesting if one is also in a position to analyse this using quantum mechanics and model it. The so-called collision theory is used, wherein the individual areas of FIG. 6 are to serve for this purpose. A collision course on the X-axis starting from zero is shown in A. This zero line changes abruptly over the collision in the area at a, in order to then hold in the collision maximum on the X-axis of y=1.0 and the duration of x=−0.5 via 0 to +0.5 and fall again to y=0.0 in area b. The calculation of the collision function has been shown briefly under the drawing.

If the areas a and b in the drawing of A coincide, thus achieve an amount x approximately equalling 0, the result is the drawing in area B of FIG. 6, where the collision function is optically fixed as arrow K of the unit length 1 in the function x(t). This is the Dirac collision of the unit value 1 at point in time t=T. The corresponding collision function x(t) is shown below it.

However, as not just one collision is involved, but a sequence of collisions over time t, the known Dirac comb is obtained, as can be seen in area C of FIG. 6. The collision function of the Dirac comb is given below the drawing in the form of a δ-function.

It is proposed to regard the reaction chamber virtually as vector space, preferably as Hilbert space with the coordinates time t and pulse p, wherein path coordinates are not provided in the vector space and the individual state is described by the wave function ψ(x). The observables t and p correspond to hermitian operators A . . . , wherein the temporal development of the individual states is determined by the Schrödinger equation (q.v.). It follows that the probability density function for the position can be described as $|\psi(x)|^2$.

It is important that every particle can be described one-dimensionally by position and path in this way, i.e. modelled, which is to be the thus indicated aim of this quantum mechanics approach and not according to the customary macroscopic presentation as an undefinable heap of molecules, in which the important chemisorption is left to chance (see also Ertl, *Reaktionen an Oberflächen: Vom Atomaren zum Komplexen*, Angewandte Chemie 2008-120/19, p. 3582 ff.).

LIST OF REFERENCES

BL boundary layer
CU current of the reaction medium
E educt
ES external catalyst surface
IS pore
P product
S sinusoidal modulation signal
AM amplitude-modulated signal
0 origin
1
1*a* film diffusion
2 adsorption/physisorption
3 surface reaction/chemisorption
4 desorption/Knudsen diffusion
5*a* pore diffusion
5*b* film diffusion
10 parabolic current profile
11 turbulent current course/curve
12 uniform current
20 catalyst
21, 22, 23 oscillator
24 fluid
31 modulation signal
32 pulse train
41 modulation signal, amplitude-modulated pulse signal
42 pulse train
43 frequency-modulated pulse signal
51 modulation signal
52 pulse train
53 phase-modulated pulse signal

The invention claimed is:

1. Method for carrying out a heterogeneous catalytic chemical reaction in a reaction fluid which flows through a catalyst and which comprises at least one educt,
    wherein the catalyst is subjected to a mechanical oscillation by at least one mechanical oscillator in the range of from 20 kHz to 2 GHz, and
    wherein the at least one mechanical oscillator is controlled by a signal with pulse amplitude modulation.

2. Method according to claim 1, in which the oscillation frequency is chosen such that the molecular mass of the at least one educt is excited to oscillate.

\* \* \* \* \*